United States Patent
Lui et al.

(10) Patent No.: US 10,752,374 B1
(45) Date of Patent: Aug. 25, 2020

(54) ACTIVE FUEL THERMAL CONDITIONING FOR AIRCRAFT

(71) Applicants: Clarence Lui, Diamond Bar, CA (US); Matthew Dooley, Torrance, CA (US)

(72) Inventors: Clarence Lui, Diamond Bar, CA (US); Matthew Dooley, Torrance, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 541 days.

(21) Appl. No.: 15/459,823

(22) Filed: Mar. 15, 2017

(51) Int. Cl.
  B64D 37/00 (2006.01)
  B64D 37/34 (2006.01)
  F02C 7/224 (2006.01)
  B64D 13/08 (2006.01)
  B64D 37/02 (2006.01)
  B64D 13/06 (2006.01)

(52) U.S. Cl.
  CPC ............ *B64D 37/34* (2013.01); *B64D 13/08* (2013.01); *F02C 7/224* (2013.01); *B64D 37/02* (2013.01); *B64D 2013/0614* (2013.01); *B64D 2013/0696* (2013.01); *F05D 2270/07* (2013.01)

(58) Field of Classification Search
  CPC ................... B64D 37/34; B64D 18/08; B64D 2013/0614; B64D 2013/0696; F05D 2270/07; F02C 7/224; F02C 7/14; F02C 7/22; F02C 7/28; F02C 7/36
  See application file for complete search history.

(56) References Cited

U.S. PATENT DOCUMENTS

| 4,505,124 A * | 3/1985 | Mayer ................... B64D 37/34 123/553 |
| 6,415,595 B1* | 7/2002 | Wilmot, Jr. .......... B64D 13/006 60/266 |
| 7,624,592 B2 | 12/2009 | Lui et al. |
| 2007/0266695 A1* | 11/2007 | Lui ........................ B64D 13/06 60/204 |
| 2012/0297780 A1* | 11/2012 | Bruno ...................... F02C 7/14 60/772 |
| 2013/0170262 A1 | 7/2013 | Rapoport |
| 2018/0229849 A1* | 8/2018 | Behrens ................... F02C 6/08 |

* cited by examiner

*Primary Examiner* — Todd E Manahan
*Assistant Examiner* — Edwin Kang
(74) *Attorney, Agent, or Firm* — Tarolli, Sundheim, Covell & Tummino LLP

(57) ABSTRACT

Fuel used as a coolant in an aircraft can be thermally conditioned for active thermal management of the airframe and engine. The fuel can be thermally conditioned using the residual cooling capacity of a power and thermal module (PTM), providing flexibility of thermal system design, or via a compact engine-mounted turbo cooler, to maximize system efficiency. The fuel can be stored in a thermal reserve tank to provide a missionized heat sink capable serviceable for periodic high heat flux equipment. The cooling and provision of cooled fuel to aircraft components can be intelligently controlled to provide efficient cooling and effectively unlimited ground hold times.

12 Claims, 8 Drawing Sheets

ACTIVE FUEL THERMAL CONDITIONING FOR AIRCRAFT

TECHNICAL FIELD

The present invention relates to systems and methods for cooling aircraft components. Particularly, the present invention relates to aircraft cooling using the fuel of the aircraft as a coolant.

BACKGROUND

Aircraft engines and other aircraft components generate waste heat. If the waste heat is not disposed of, the components can fail from overheating, which has the potential to result in the loss of the aircraft. One way of disposing of waste heat is to force ambient air to enter an intake aperture, causing waste heat to be carried away with the exhaust of the air. Such "ram air" methods carry a drag penalty, however.

An aircraft's fuel can be also used as a heat sink for thermal management in modern high-performance aircraft designs. Waste heat absorbed to fuel can be exhausted with the combustion of the fuel. Fuel serves as a convenient resource and offers the benefits of minimizing or eliminating ram air drag penalty, which further results in a reduced radar signature for higher survivability. High performance legacy fighter aircraft, such as the F-18, F-22 and F-35, use fuel as a primary and secondary heat sink for their thermal systems.

SUMMARY

In one example, there is provided an active aircraft thermal management system. The system includes at least one fuel supply conduit to provide fuel from at least one fuel storage tank, to sink waste heat from one or more aircraft systems to fuel, and send the collected waste heat to one or more engines via the fuel. The system further includes at least one engine fuel system to sink heat from engine lubricant to fuel and to provide at least one engine with fuel for combustion. The system further includes a power and thermal module (PTM), comprising an air cycle machine, to provide power to start one or more engines, condition air to provide cool air to a thermal load, and thermally condition fuel. As used herein, the term "thermal conditioning" includes cooling and stabilizing the temperature of fuel or non-fuel coolant, and expressly excludes heating, and need not require making compositional or chemical changes to the fuel or non-fuel coolant. "Thermal conditioning" may include, but need not require, chilling of fuel or non-fuel coolant, where "chilling," as used herein, means cooling to below 45° F. The system further includes at least one return fuel conduit to return uncombusted fuel. The system further includes a thermal tank to hold conditioned return fuel.

The PTM provides power to start one or more engines and conditions air to provide conditioned air to air-cooled aircraft components. The PTM can further monitor temperature of supply fuel, condition the supply fuel to below a supply temperature such that the supply fuel can cool engine components while remaining below the fuel's coking limit prior to combustion in the engine, and condition uncombusted return fuel for storage in the thermal tank. The PTM can sink waste heat to ambient air via a ram air intake.

In another example, there is provided a method for active aircraft thermal management. The method includes cooling supply fuel to a supply temperature at or below a temperature needed to maintain engine accessories within their operating limits and engine fuel nozzle below a fuel coking limit. The method also includes eliminating waste heat transferred to fuel by combusting the fuel. The method further includes further cooling excess fuel. The method still further includes storing excess fuel in a dedicated thermal tank as reserve heat sink. The method additionally includes cooling one or more aircraft components using the fuel. The cooling of supply fuel and the further cooling excess fuel can be done using a PTM or an engine-mounted turbo cooler.

In yet another example, there is provided another method for active aircraft thermal management. The method includes cooling supply fuel to a supply temperature at or below a temperature needed to maintain engine accessories within their operating limits and engine fuel nozzle below a fuel coking limit. The method furthers include rejecting waste heat to an engine airstream. The method also includes eliminating waste heat transferred to fuel by combusting the fuel. The method still further includes returning and storing excess fuel in a dedicated thermal tank as reserve heat sink. The method additionally includes cooling one or more aircraft components using the fuel.

DETAILED DESCRIPTION

Fuel as a primary heat sink has its limitations. In systems that use fuel as a heat sink, heat sink capacity is limited to both the amount of fuel available and to engine demand for fuel. The availability of fuel as a heat sink is thus mission segment dependent. Typically, ample heat sink capacity is available at high engine power settings when fuel demand is high. During cruise at optimum range, idle descent, loiter and ground static operation, where engine power setting and fuel demand is low, however, the fuel heat sink capacity is significantly lower.

Moreover, high-temperature fuel, when combusted, can cause coke deposits to form in engine components, resulting in progressive degradation of engine performance. Thus, the maximum operating temperature of aviation fuel is limited by a coking temperature limit. Chemical fuel additives and fuel stabilization systems that remove the oxygen content of fuel can raise the temperature of the fuel at which coking begins to occur, but such strategies result in only marginal increases in coking temperature, and cannot eliminate coking temperature limits. Additionally, the presence of anti-coking additives may not be desirable for all uses to which the fuel is put, and may be cost-prohibitive.

As a result, heat absorption capacity of fuel may be limited by initial temperature of fuel in the tank(s) (typically, 60° F. fuel loading for standard-temperature day and as high as 120° F. for hot day) and the coking limit (typically in the range of about 300° F. at the engine fuel nozzle).

Figure 1:
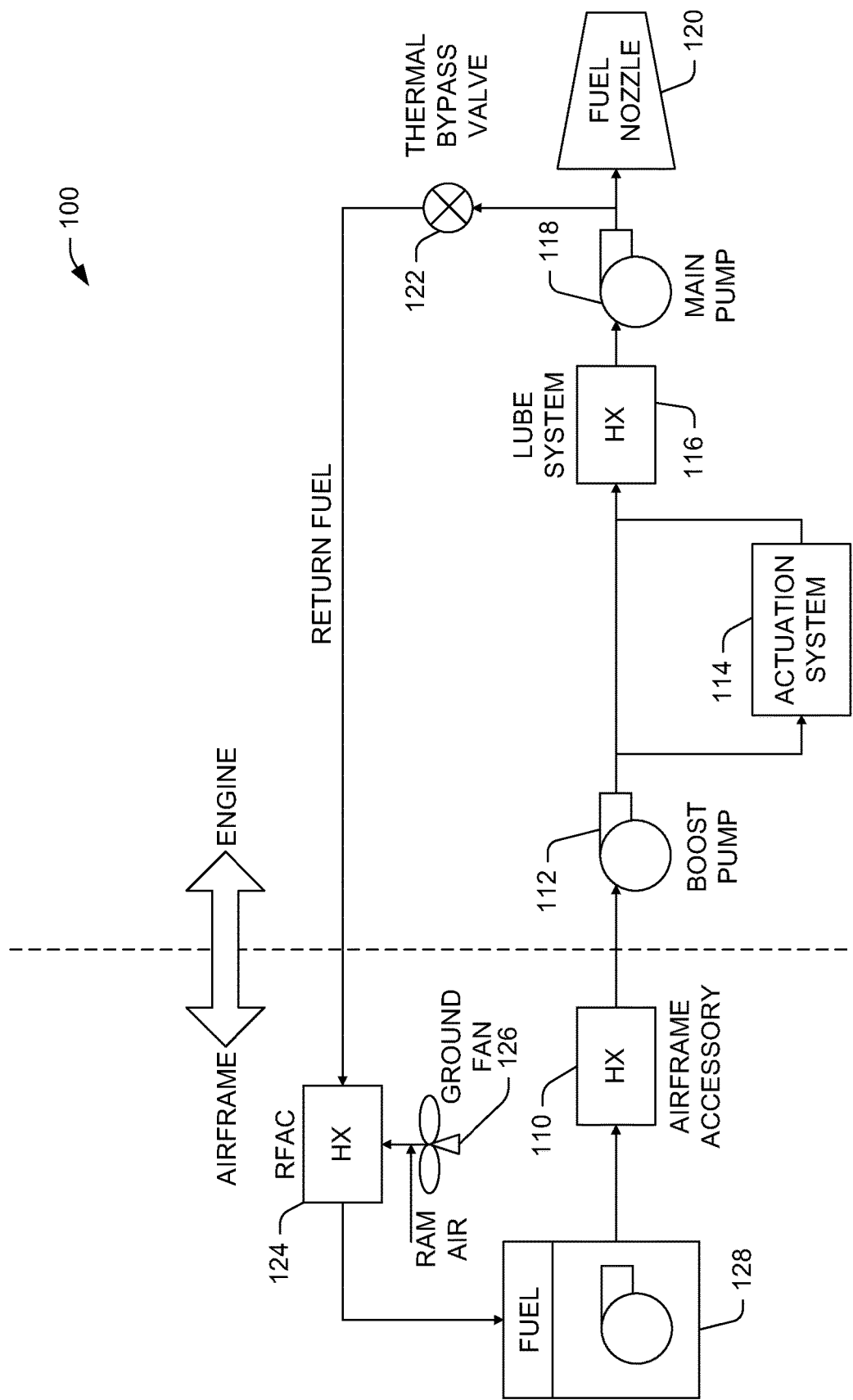
FIG. 1 illustrates a prior art fuel-based aircraft thermal management system.

An example prior art fuel heat sink thermal system 100, used for subsonic and supersonic aircraft, is shown in FIG. 1. A broken line in FIG. 1 divides the diagram into an airframe side and an engine side. Solid lines in FIG. 1 represent fuel conduits in a circulating fuel cooling system 100 through which fuel can be pumped by main pump 118, primarily to deliver fuel for combustion via nozzle 120, and/or boost pump 112, which can increase the fuel pressure to provide circulation for cooling. The system 100 can transfer waste heat from airframe accessory to fuel via heat exchanger (HX) 110, or from the engine to fuel by way of the engine's lubrication system via HX 116. Fuel can also cool engine actuation system 114, illustrated as placed in parallel with the rest of the circuit.

In order to operate throughout the entire flight envelope, the system can have a thermal bypass valve 122 and associated sensors (not shown) to monitor the coking limit of the fuel and other fluid temperature limits of the accessory systems, such as engine lube oil and hydraulic oil. Valve 122 can be controlled to modulate the system flow to maintain the fuel temperature below the coking limit at the inlet of the fuel nozzle 120 and/or the fluid temperatures below maximum set points. The additional fuel flow, i.e., flow beyond the engine demand, may return back to the aircraft fuel tank(s) 128 at elevated temperatures (as high as 300° F.). In order to maintain a thermally balanced fuel system, especially during hot day operation, the return fuel temperature can be reduced by a return fluid air cooler (RFAC), e.g., ram air via a fuel-to-air heat exchanger 124 in the recirculation path. During low speed and ground static operation when ram air flow is low or not available, an ejector or mechanically driven fan 126 can assist to provide sufficient ambient air for heat removal.

Ground operations (normally pre or post flight) may dictate the system sizing criteria. Challenges related to weight, space and energy penalty, as may be incurred by ram air systems or bleed or electrical power systems, for example, can add constraints to the design of system 100. For example, in cases where an aircraft has a large heat load but low fuel flow, as when on the ground, larger heat exchangers may be required, adding to system weight. Under these constraints, system 100 and similar systems may be underperform where marginal air flow supply and heat exchanger performance limits the aircraft operation, especially during pre and post flight ground operating time during which the aircraft has the least fuel, and thus the least ability to sink heat to fuel. Loading the aircraft with pre-chilled fuel, while undesirable, may be required to supplement the fuel heat sink capacity.

FIGS. 2a, 2b, 3a, and 3b illustrate example active systems 2, 200, 3, 300 for monitoring, controlling and conditioning aircraft engine fuel within the natural operating limits of the fuel, i.e., without the need for expensive anti-coking additives or oxygen-elimination systems. The illustrated examples systems 2, 200, 3, 300 improve system installation by reducing and simplifying fluid transportation routing and by allowing the use of more compact liquid-to-air heat exchangers to replace bulky air-to-air heat exchangers.

The illustrated systems 2, 200, 3, 300 provide active cooling, and can be implemented either through overall aircraft integration or as a compact engine mounted cooling unit. In either instance, the systems 2, 200, 3, 300 provide engine fuel supply monitoring as well as cooling for any return fuel back to the main aircraft fuel tanks. The illustrated systems 2, 200, 3, 300 thus provide the possibility of a more efficient installation by minimizing parasitic routing. In the example systems 2, 200, 3, 300, all aircraft waste heat is sent to the engine(s) 22, 28, 208, 308 through the fuel supply 4, 204, 304. So as to prevent the temperatures of the engine fuel supply 4, 204, 304 from exceeding coking limits, an active thermal management system 2, 200, 3, 300 can be provided to monitor, control and condition the fuel supply 4, 204, 304.

Figure 2A:
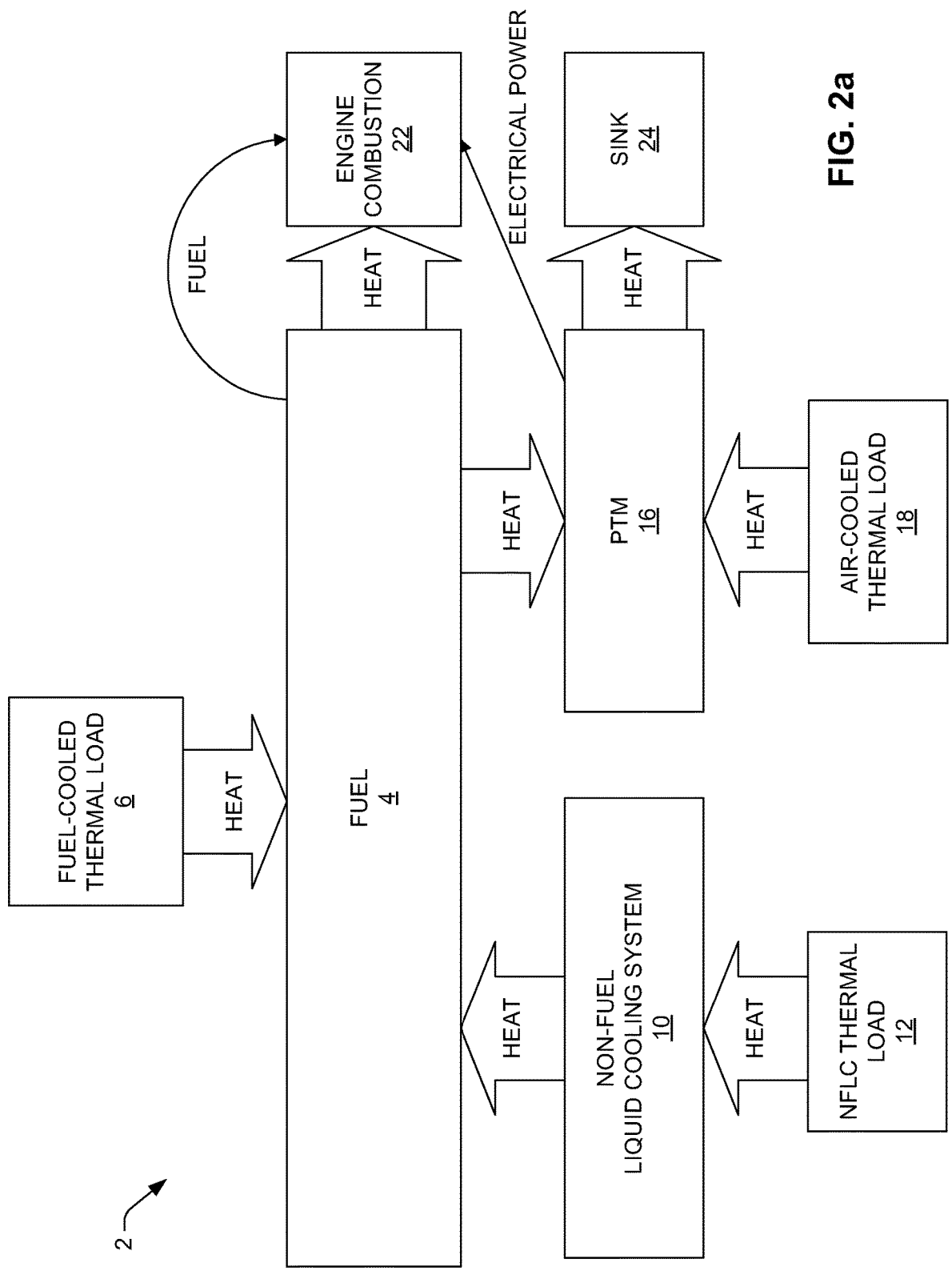
FIGS. 2a-2b illustrate examples of fuel-based aircraft thermal management systems.

FIG. 2a is diagram illustrating heat flow in example active cooling system 2. Fuel 4 can circulate through supply and return conduits (not shown in FIG. 2a) not only to supply fuel for engine combustion 22 but also to serve as a coolant for one or more aircraft systems. For example, certain aircraft systems, depicted in FIG. 2a as fuel-cooled thermal load 6, can be cooled by fuel directly, either by circulating fuel around the components or via one or more heat exchangers to transfer heat from the load to the fuel. As one example of a load 6, one or more airframe accessories can generate heat which can be sinked to fuel 4, in some examples via one or more compact liquid-to-liquid heat exchangers (not shown in FIG. 2a). The one or more airframe accessories might include, for example, hydraulics to control aircraft systems such as landing gear and/or control surfaces. As another example, fuel can also absorb heat from an engine actuation system. As still another example of a fuel-cooled thermal load 6, one or more engines in the aircraft can generate heat which can be carried by a lubricant, e.g., in a gearbox (not shown in FIG. 2a). Another compact liquid-to-liquid heat exchanger (not shown in FIG. 2a) can transfer the waste heat from the lubricant to fuel 4.

Minor leaks in a fuel-based cooling system may cause damage to certain sensitive components or present excessive risks of combustion when such components are exposed to fuel. Therefore, in some examples, it may be advantageous to provide a non-fuel liquid coolant to absorb heat from thermal loads that, for whatever reason, should not be exposed to fuel. Absorbed heat can then be transferred to fuel indirectly through a non-fuel liquid cooling system 10. Such loads may be referred to as non-fuel liquid coolant (NFLC) thermal loads and are illustrated in FIG. 2a as NFLC thermal load 12. As one example of NFLC loads 12, sensors, avionics, and periodic high heat flux equipment are examples of NFLC loads 12 that can sink waste heat to fuel 4 indirectly. The transfer of heat between non-fuel liquid cooling system 10 and fuel 4 can be, for example, via one or more compact liquid-to-liquid heat exchangers (not shown in FIG. 2a).

Aircraft thermal system 2 can further include can include a power and thermal module (PTM) that can comprise an air cycle machine to provide cool air to any air-cooled thermal load 18. PTM can, for example, comprise or be part of an environmental control system (ECS). Examples of such thermal loads 18 could include crew station and/or air-cooled equipment, effectively sinking heat from crew and components. Residual heat-sinking capacity of PTM 16 can be used to thermally condition fuel 4. In some examples, PTM 16 can intelligently remove enough heat from fuel 4 such that fuel 4 can sufficiently cool engine and associated accessories (e.g., via engine lubricant) while still remaining beneath the coking limit of fuel. In turn, PTM 16 can sink waste heat to sink 24. Sink 24 can consist of, for example, ram air, engine fan air, third-stream air, or other cold air sources. Fuel 4 can be provided to engine 22 for combustion, effectively removing from the system all waste heat transferred to fuel 4 from the aircraft.

Figure 2B:
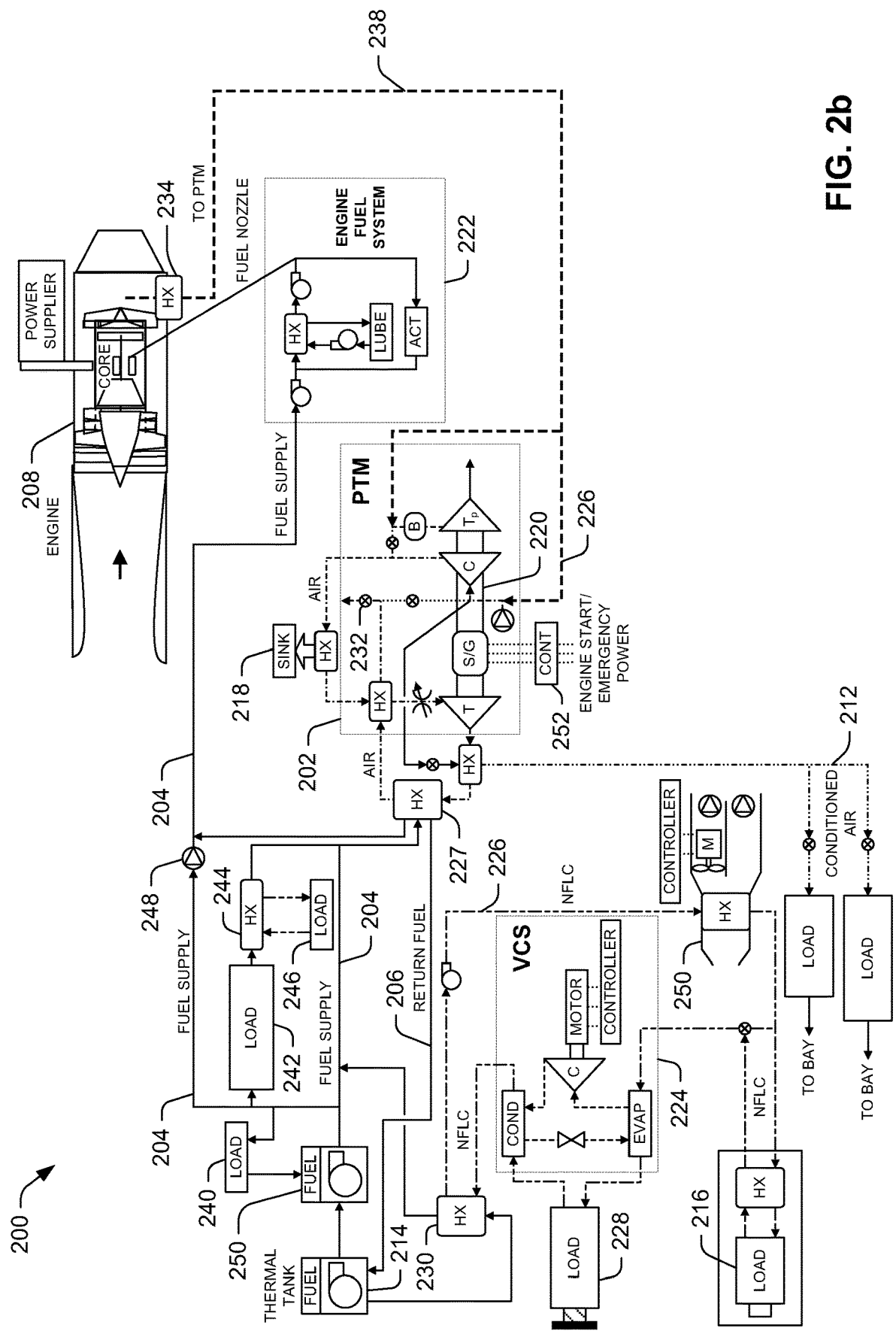

FIG. 2b shows in greater detail a system 200 that can correspond to system 2 in FIG. 2a. In the example shown in FIG. 2b, system 200 can include a power and thermal module (PTM) 202, which can correspond to PTM 16 in FIG. 2a. PTM 202 can be, for example, an integrated power and cooling unit (IPCU) as described in U.S. Pat. No. 7,624,592 B2, which is herein incorporated by reference. In a power generation mode, PTM 202 can provide startup electrical power to one or more engines 208 and can also provide emergency electrical power to the aircraft, in either case, in some examples, via controller 252. In a cooling mode, PTM 202 can provide cool air to thermal loads such as a crew station and/or air-cooled equipment, corresponding to load 18 in FIG. 2a, effectively sinking heat from crew and components.

Residual heat-sinking capacity of PTM 202 can be used to thermally condition fuel 204. In some examples, PTM can intelligently remove enough heat from fuel 204 such that fuel 204 can sufficiently cool engine and associated accessories (e.g., via lubricant LUBE in engine fuel system 222, which can correspond to fuel-cooled thermal load 6 in system 2 shown in FIG. 2a) while still remaining beneath the coking limit of fuel. In turn, PTM 202 can sink waste heat to sink 218, which can correspond to sink 24 in system 2 shown in FIG. 2a, and can consist of, for example, ram air, engine fan air, third-stream air, or other cold air sources. Fuel 204 can be provided to one or more engines 208 for combustion, effectively removing from the system all waste heat transferred to fuel 204 from the aircraft.

PTM 202 can include a turbine machine 220 that can include cooling turbine T, starter/generator S/G, compressor C, power turbine $T_p$, and burner B. Starter/generator S/G can be connected to a controller CONT 252, which can include, for example, a battery and a power conditioner (not shown) to receive electric power to accelerate turbine machine 220 to an ignition speed, whereupon compressor C, power turbine $T_p$, and burner B can operate as a gas turbine engine to generate power and/or cooling. Controller 252 can, in turn, provide electrical power from PTM 202 to engine(s) 208 and/or can provide emergency electrical power to the aircraft.

In cooling mode of turbine machine 220, burner B can be switched off and power turbine $T_p$ can use energy from the expansion of the discharge air of the engine(s) 208 to drive compressor C so as to form a semi-closed cooling circuit. The semi-closed loop air can absorb waste heat from liquid-cooled equipment and reject the heat to heat exchangers HX in the form of engine fan air and/or on-board fuel. In this way, PTM 202 can be integrated with the engine fuel feed loop 204, 206 to condition the temperatures of the fuel supplied to the engine(s) 208. Thus, PTM 202 can provide both supplemental power and thermal management to the aircraft. PTM 202 can operate in a closed loop where air entering and exiting the compressor C is the same air entering and exiting the cooling turbine, and/or can also include valve 232 that can open to throw air overboard to allow PTM 202 to operate in an open loop mode.

To provide its thermal management function, PTM 202 can provide conditioned air 212 for thermal loads corresponding to air-cooled thermal load 18 in FIG. 2a, which might include, for example, onboard crew members and forced air cooled equipment. Residual cooling capacity of PTM 202 can serve as a heat sink to monitor and condition the engine fuel supply 204. Engine fuel supply 204 can have two stages of cooling. The first stage can condition the fuel supply temperature to maintain the engine accessories within their operating limits and the engine fuel nozzle below the coking limit. The second stage can further cool the excessive (i.e., uncombusted) fuel so that it can be stored in a dedicated thermal tank 214 as reserve heat sink. The thermally conditioned reserve heat sink fuel can be circulated throughout the aircraft to absorb not only engine heat but also large transient heat loads produced by onboard systems high heat flux equipment, as may correspond to NFLC thermal load 12 in FIG. 2a and load 216 in FIG. 2b, that may impart periodic or instantaneous loads to the thermal management system 200.

If bleed air 238 provided from one or more engines 208 to compressor C of PTM 202 is not pre-cooled, then the air entering compressor C can be excessively hot. Each engine 208 therefore can have a pre-cooler heat exchanger 234 to cool bleed air 238 prior to the bleed air entering the compressor C of PTM 202.

FIG. 2b illustrates an example where a single PTM 202 is driven by bleed air 238 from an engine 208. The example is extendable, however, to any number of PTMs and any number of engines. As examples, two PTMs may be fed bleed each from one engine in a two-engine aircraft; one PTM may be fed bleed air from more than two engines; or multiple PTMs may be fed bleed air from a single engine.

As shown in FIG. 2b, system 200 can use the engine fuel feeding system 204 as a main conduit to collect waste heat from the entire aircraft and send the collected waste heat to the engine(s) 208. Resultantly, system 200 can minimize or eliminate parasitic ducting associated with other subsystems, resulting in a more efficient integration with cleaner installation. System 200 can also include a heat exchanger to reject PTM heat to heat sink 218. Heat sink 218, which can correspond to sink 25 in FIG. 2a, can consist of ram air, engine fan air, third-stream air, or other cold air sources. In contrast to use of ram air in system 100 to cool fuel, as shown at 114 in FIG. 1, sink 218 in system 200 is used to cool air in the PTM turbine machine 220, not liquid fuel.

System 200 can further include engine fuel system 222 to transfer heat from engine lubricant and/or engine actuators to fuel. As one example, engine fuel system can transfer engine heat from engine lubricant LUBE to fuel via heat exchanger HX, and/or can cool one or more actuators ACT using fuel. Actuation system ACT in engine fuel system 222 in FIG. 2b can correspond to actuation system 114 in system 100 shown in FIG. 1, and engine lubricant can correspond to fuel-cooled thermal load 6 in FIG. 2a. Engine fuel system 222 can also provide fuel, via a fuel nozzle, to be burned in a combustor in engine core, labeled CORE, which can correspond to engine combustion 22 in FIG. 2a. Although a single engine fuel system 222 is illustrated in FIG. 2b, each engine may have its own engine fuel system 222, may have multiple engine fuel systems 222, or may not include an engine fuel system 222.

System 200 can include one or more fuel cooling circuits, which can include fuel supply conduit 204, return fuel conduit 206, and one or more storage tanks 214, 250, each of which can have associated fuel pumps. One or more of the tanks can be used to store a large reserve of thermally conditioned fuel 214 that can be sized for the particular mission or application, for example, to store a large enough supply of fuel to cool high heat flux equipment. Although only one cooling circuit is illustrated in FIG. 2b, system 200 can have multiple independent cooling circuits that use fuel to cool components. To prevent heated fuel from re-entering pumps and/or tanks, each circuit can include one or more check valves, such as check valve 248, to prevent backpressure-induced reverse flow of fuel through the circuit.

As shown in FIG. 2b, fuel 204 can also be used to cool high-priority thermal loads 240, 242, 246. A high-priority load is one that requires lower operating temperatures among cooled components. For example, an engine control unit may require temperatures no greater than 140° F. to operate, whereas the interface to fuel system 222 can be, for example, more than 200° F. An "engine control unit" is any electronic controller that adjusts engine actuators based on engine sensor readings to improve or optimize engine performance, and can include, but is not limited to, a FADEC. Other examples of high-priority loads might be an electrical generator and associated controller that may be used, for example, to generate electrical power for the aircraft and to control such generation, and hydraulics, e.g., pumps, which might be cooled through a fuel-to-oil or fuel-to-coolant heat exchanger, such as HX 244. Accordingly, loads 240, 242, 246 can be given preferential cooling treatment in system 200 by placing loads 240, 242, 246 upstream in the fuel cooling circuit relative to other cooled components.

System 200 in FIG. 2b can additionally include one or more non-fuel liquid cooling circuits that can correspond to 10 in FIG. 2a. Such circuits can include conduits 226 for conveying a non-fuel liquid coolant (NFLC) such as an ethylene glycol and water solution (EGW), oil, polyalphaolefin (PAO), or a dielectric fluid such as perfluorohexane, perfluoro(2-butyl-tetrahydrofurane), or perfluorotripentylamine. PAO has a wide operating temperature range and advantageous dielectric properties in the event of exposure of leaked coolant to avionics, so in some examples, PAO can be used as a non-fuel liquid coolant, but NFLC conduits 226 in FIG. 2b can carry any suitable non-fuel liquid coolant. While one non-fuel liquid cooling circuit is illustrated in FIG. 2b, system 200 can include multiple such circuits, and different circuits can use different coolants. Such non-fuel liquid cooling circuits can be used to cool any thermal load 228, which can correspond to load 12 in FIG. 2a, for which it would be undesirable to expose to fuel, such as sensors and/or avionics. Such circuits can also be used to cool any periodic high heat flux equipment or instantaneous load, corresponding, for example, to load 216. Whatever the type of coolant used, heat from coolant can be transferred to fuel by compact liquid-to-liquid heat exchanger (HX) 230.

Each non-fuel liquid cooling circuit can include a vapor cycle system (VCS) 224, which can include compressor C, driven by the illustrated motor and controlled by the illustrated controller, and condenser COND and evaporator EVAP, connected to each other by an expansion valve. VCS 224 can compress a refrigerant, condense it so that it becomes like a liquid, and then expand it to lower pressure, whereupon it can absorb heat from non-fuel liquid coolant in evaporator of VCS 224. This cooling action can supply lower temperatures needed to cool, for example, a liquid-cooled sensor component, such as a radar component or imaging sensor in sensor/avionics. Each non-fuel liquid cooling circuit can also include a ground cooling fan 250 comprising a heat exchanger (HX), motor-driven fan, controller, and air inlet and outlet to cool the non-fuel liquid coolant, such as PAO, while the aircraft is on the ground and cooling provided by fuel, PTM, and ram air are more limited.

Owing to the arrangement described herein, each non-fuel liquid cooling circuit in system 200 can use the residual cooling from the non-fuel liquid coolant (e.g., PAO) 326 for VCS condensation, i.e., the non-fuel liquid coolant 326 can be used as a condensing fluid for the VCS 224. The end result is a significant elevation in coefficient of performance (COP) of VCS 224, e.g., greater than 100% improvement in COP, due to the lower condensing temperatures.

System 200 in FIG. 2b can further include two-stage heat exchanger 227. Heat exchanger 227 can take in conditioned air from PTM 202 and use it to condition both the engine supply flow 204 as well as recirculation flow 206. As illustrated, two-stage heat exchanger 227 can have one fuel input, combining supply fuel from tank(s) 214, 250 and heated fuel from high-priority non-engine components 242, 246, and two fuel outputs, engine supply fuel 204 and return fuel 206 to be stored in thermal tank 214. Distribution of flow between the two outputs can be regulated either actively or passively. If regulated actively, a controller associated with the HX (not shown) can regulate the relative flow between the two outputs, for example, by adjusting output valves (not shown). If regulated passively, the output flows are dictated by relative pressures in the system (i.e., upstream draws). PTM 202 and heat exchanger 227 together can form a two-stage fuel conditioner with internal control of the split of the output fuel flow and conditioned fuel temperature. Such a two-stage fuel conditioner can provide different temperature conditioning to supply fuel and return fuel.

Figure 3A:
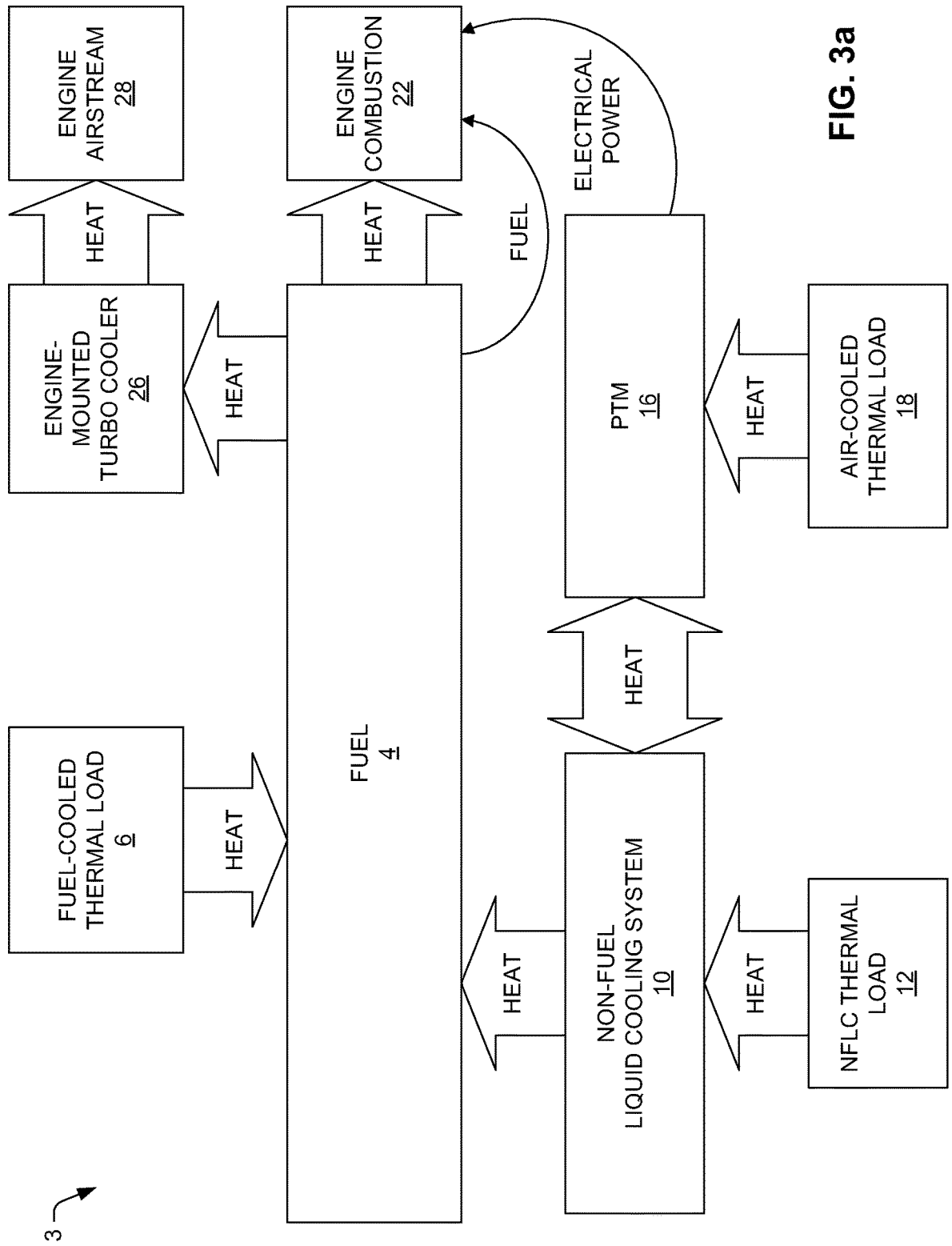
FIGS. 3a-3b illustrate examples of fuel-based aircraft thermal management systems.

FIG. 3a is diagram illustrating heat flow in example active cooling system 3. Many components of system 3 function similarly to same-labeled components in system 2. However, system 3 can eliminate sink 24 by having ECS 16 transfer waste heat to fuel 4 via non-fuel liquid cooling system 10. At the same time, ECS 16 can provide extra cooling to non-fuel liquid cooling system 10 so as to cool NFLC loads 12 such as sensor/avionics and periodic high heat flux equipment. Rather than fuel 4 being cooled by residual cooling capacity of ECS 16, as it is in system 2, system 3 can provide an engine-mounted turbo cooler to efficiently remove heat from fuel with minimized impact to engine efficiency and overall system efficiency. Heat from the turbo cooler 26 can be rejected to the engine airstream 28. As in system 2, waste heat transferred to fuel 4 from aircraft and engine components 6, 12, 18 can also be removed from the system when fuel is combusted in the engine 22.

Figure 3B:
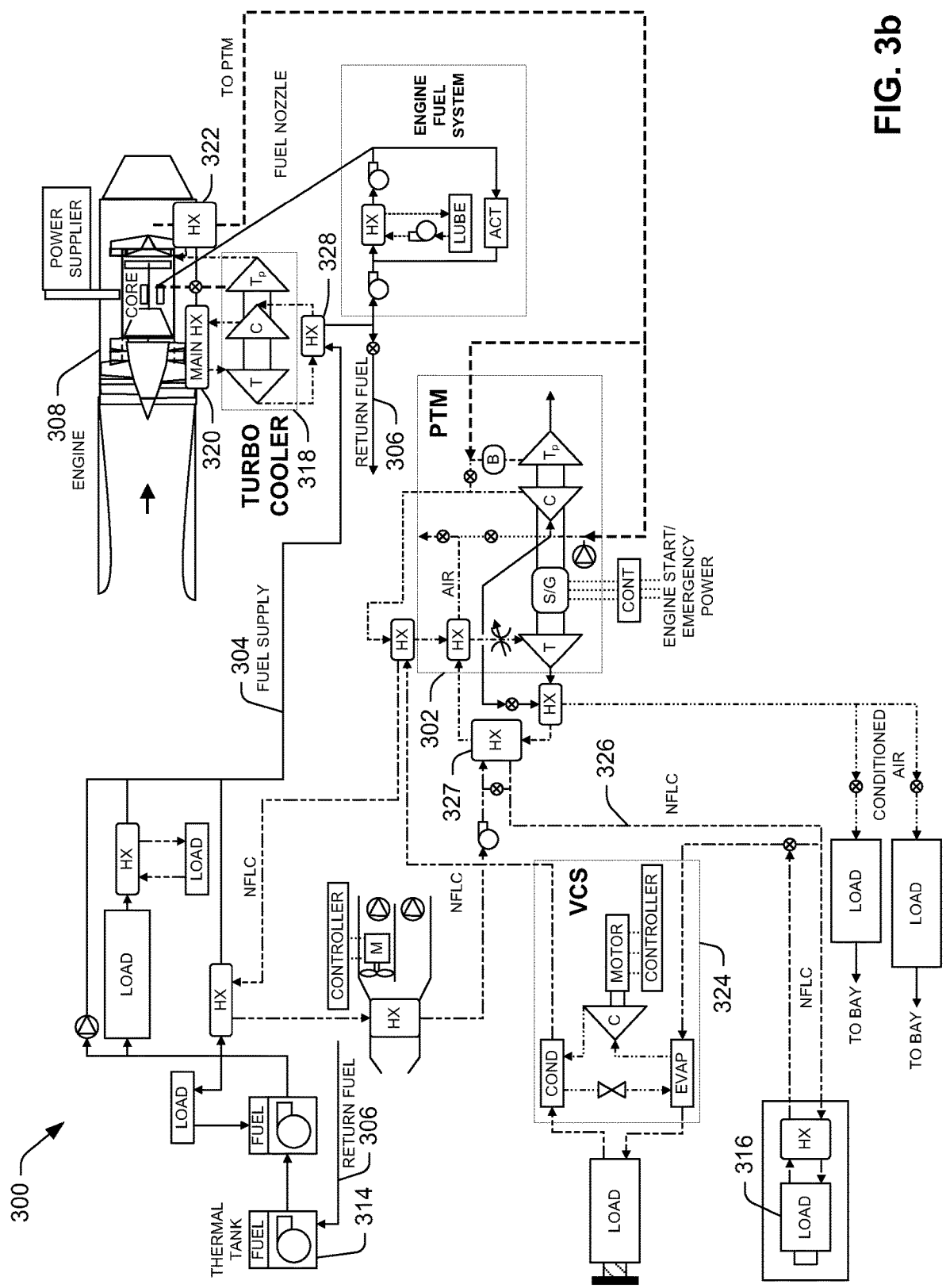

FIG. 3b shows in greater detail a system 300 that can correspond to system 3 in FIG. 3a. System 300 can have an PTM 302 that can correspond to ECS 16 in system 3 of FIG. 3a and can function similarly to PTM 202 in system 200 of FIG. 2b. However, as illustrated, PTM 302 uses its excess cooling capacity to cool non-fuel liquid coolant 326 rather than cooling fuel 304. System 300 can further include a dedicated engine-embedded turbo machine 318, or "turbo cooler," to monitor and condition the temperatures of the engine supply fuel 304. Turbo cooler 318 therefore allows fuel to be more effectively used to sink heat from heat-generating components of the aircraft and then cooled to below a coking limit prior to combustion or recirculation back to thermal tank 314. Turbo cooler 318 can correspond to turbo cooler 26 in FIG. 3a.

Turbo cooler 318 can be a compact unit that can reside on the engine exterior casing, similar to a turbo charger in automobile applications. In this way, turbo cooler 318 can effectively be part of the engine to increase the cooling capability of the engine. Turbo cooler 318 can have a compressor C and two turbines T and $T_p$ on the same shaft. Turbine $T_p$ can expand the engine combustor air to drive a closed loop air cooling cycle coupled by the compressor C and the other turbine T. The expanded air can return to the engine turbine discharge and rejoin the engine main flow for producing thrust. This functioning of turbo cooler 318 offers a minimized detrimental impact on propulsion energy. The driving force of the turbo cooler 318 is the internal air of the engine 308.

For greater compactness, the compressor C of turbo cooler 318 can be fed with un-throttled engine compressor discharge air. The high pressures from the engine 308 allow the compressor C to have minimized diameter, thus yielding a compact machine 318. For example, compressor C of turbo cooler 318 can have a diameter less than 1 foot, and can accommodate pressure ratios of about 6:1, with inlet pressures to the compressor of about 250 psia. Wasted heat taken from the fuel by turbo cooler 318 can be rejected to the engine internal air (fan or other stages) via embedded heat exchangers 320, 322 inside the engine 308. Thus, the heat from the fuel can be sinked into the airstream of the engine 308. Heat exchangers 320, 322 can likewise be extremely compact owing to the high pressures associated with engine 308. Heat exchanger 328 need not be mounted to or proximal to turbo cooler 318, but in some examples it may be integrated with turbo cooler 318. Unlike in system 200 where the PTM heat sink 218 may require a ram air circuit or additional ducting for connections to an engine-internal heat sink, system 300 allows the PTM 302 to also reject waste heat to fuel, thus further eliminating bulky air ducts. The elimination of reliance on ram air in system 300 for heat sink 218 as in system 200 can also minimize reliance on ambient air conditions and reduce the radar signature of the aircraft.

In the above way, system 300 can remove all the heat from the aircraft side, including from PTM 302 and VCS 324, and can send the collected heat to the engine 308 through the fuel supply 304. The fuel supply 304 can go to the turbo cooler 318, where the fuel supply 304 can be conditioned to the temperature that the engine 308 can accept, and also condition such that it can be returned 306 back to the aircraft so that it can be used to cool aircraft components. The removed heat can be rejected to the airstream of engine 308.

System 300 can further benefit from using more compact and space-friendlier air-to-liquid heat exchangers, as opposed to air-to-air heat exchangers. Furthermore, the decoupling of the PTM 302 from an engine air heat sink offers another degree of freedom for PTM placement, thus providing useful trade space in the thermal design layout. As a dedicated fuel thermal management unit of the engine accessories, the turbo cooler 318 can offer the same level of cooling performance as the two-stage cooling can offer in system 200. System 300 further provides other operational benefits to the aircraft, e.g., survivability, by offering an embedded engine heat sink in the form of turbo cooler 318. System 300 additionally allows for efficient installation with engine cooler 318 and heat sink in close proximity.

System 300 in FIG. 3b can also include heat exchanger 327. Heat exchanger 327 can take in conditioned air from PTM 302 and use it to condition non-fuel liquid coolant 326. Heat exchanger 328 in system 300 can condition both engine supply fuel 304 and return fuel 306. In some examples, heat exchanger 328 may be a two-stage heat exchanger similar to heat exchanger 227 in system 200 shown in FIG. 2b.

Regardless of how fuel cooling is achieved, systems 200, 300 can both store cooled return fuel in dedicated tanks 214, 314 to serve as reserve for overall thermal management heat sinking. This is particularly useful for high heat flux equipment, corresponding, for example, to load 216, 316 in FIGS. 2b and 3b, respectively, which only sees periodic operation as opposed to sustained operation. By storing a reserve of thermally conditioned fuel, the overall system can be sized to be smaller while still maintaining the cooling capacity required for larger heat loads. Because the precise amount of thermally conditioned fuel stored for periodic larger loads can be tailored to the mission operation, systems 200, 300 can more efficiently manage fuel availability both to component cooling systems and for combustion.

Systems 200, 300 offer installation advantages by eliminating/reducing the interconnecting ducting between systems, as well as granting the freedom to install critical thermal equipment. This can result in a more efficient installation, significant weight savings when compared to a prior art system that provides the same level of cooling, and heat sink enhancement to enable higher heat loads.

Systems 200, 300 both also provide active cooling capability, meaning that the temperature of the fuel is controllable so as to always be able to provide a fuel temperature appropriate for engine fuel supply, e.g., a temperature below the coking limit. Systems 200, 300 are illustrated as one-engine configurations, but the systems can be adapted to any number of engines by providing the requisite conduits, valves, heat exchangers, turbo coolers, and other components, as necessary.

Each of systems 200, 300 can include sensors and one or more controller(s) to provide smart control of the temperature of engine fuel supply and fuel used as a coolant for airframe components. For example, any of the components in systems 200, 300, including heat exchangers, engines, and airframe accessories, can include temperature sensors with electrical connections, wired or wireless, to provide feedback to a processor or controller for controlling the supply of coolants (including fuel) and/or the active cooling functions of PTM and/or turbo cooler. For example, when feedback signals from the temperature sensors indicate that the temperature of a component exceeds a predetermined or adaptive threshold, pumps and/or valves can be adjusted to increase the flow of coolant, including fuel, to the component. As another example, when increased flow of coolant (fuel or otherwise) is insufficient to remedy a component's overheating, PTM and/or turbocooler can be controlled to thermally condition additional fuel for reserve tank. The one or more processor or controller components can calculate, estimate, or predict desired fuel supply temperatures to which fuel should be cooled prior to its provision to engine accessories and for combustion, such that it can adequately cool the components and subsequently be combusted within its coking limit. In this manner, intelligent active cooling can be provided to systems 200, 300.

Figure 4:
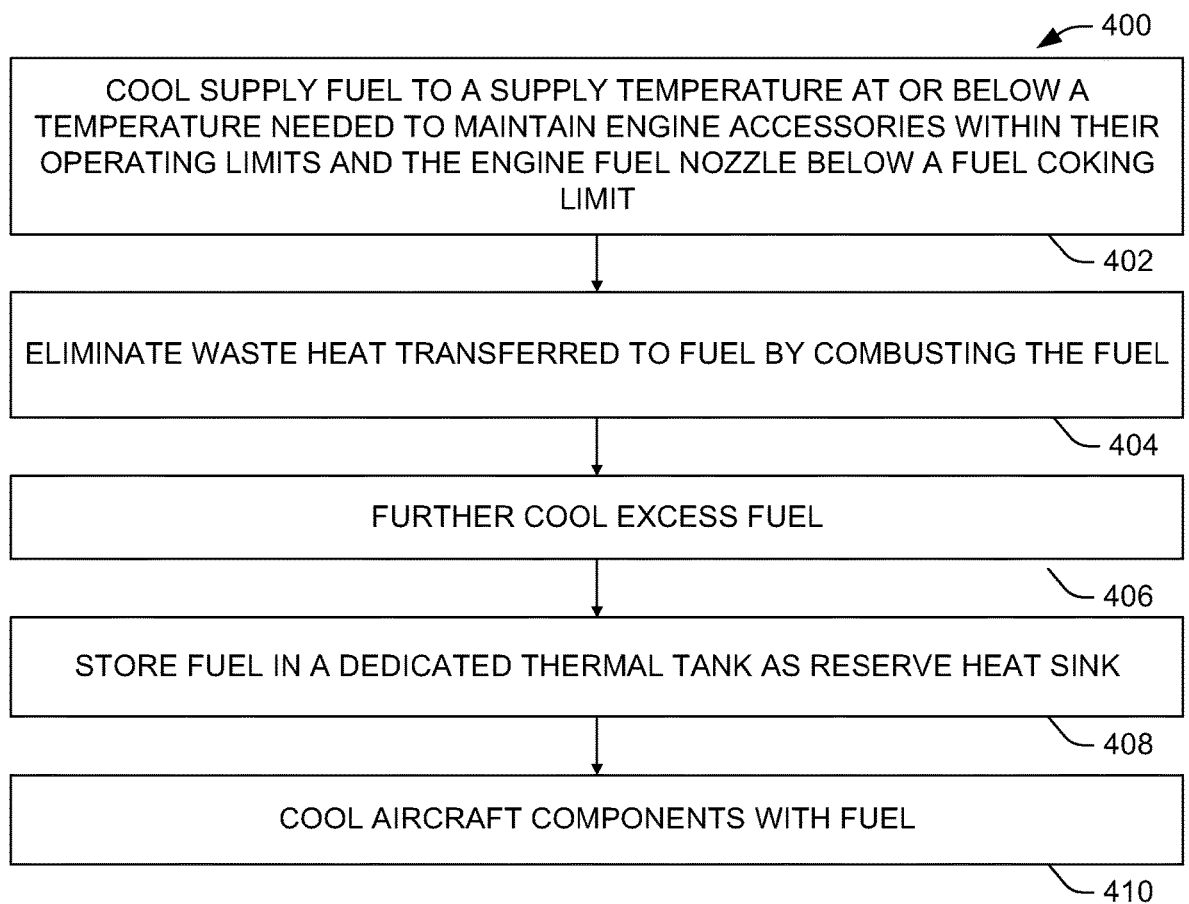
FIGS. 4-6 are flow charts showing example methods of aircraft thermal management using fuel.

FIG. 4 is a flow chart showing an example method 400 of active cooling of an aircraft. Method 400 can begin by cooling 402 supply fuel to a supply temperature at or below a temperature needed to maintain engine accessories within their operating limits and the engine fuel nozzle below a fuel coking limit. This cooling can be done, for example, using an PTM, such as PTM 202, or using a compact engine-mounted turbo machine, such as turbo cooler 318.

The particular supply temperature required can be determined empirically through estimation and/or prediction and can be based one or more of the fuel flow rate, the consumption rate of fuel by the engine, the amount of thermally conditioned reserve fuel, the specific heat of the fuel, the heat transfer coefficient of the fuel, and/or temperature sensor measurements from sensor place at or about the various components to be cooled and/or the engine nozzle. For example, the desired supply temperature can be computed as the difference between the coking limit and the change in temperature that the fuel would be known to incur from the sum of heat removed from all components between the time of the cooling of the fuel and its combustion.

Method 400 can continue with elimination 404 of waste heat transferred to fuel by combusting the fuel. Such combustion can happen, for example, in the core of an engine, such as engine(s) 208, 308. Method 400 can continue by further cooling 406 excess (i.e., uncombusted) fuel. Again, this cooling can be done, for example, using an PTM, such as PTM 202, or using a compact engine-mounted turbo machine, such as turbo cooler 318. Next, fuel can be stored 408 in a dedicated thermal tank as reserve heat sink. Aircraft components can be cooled 410 using the fuel. For example, heat can be transferred from aircraft components to fuel using one or more liquid-to-liquid or air-to-liquid heat exchangers. The cooled aircraft components can include, for example, periodic high heat flux equipment, such as loads 216, 316. One or more of the components can be cooled indirectly, with waste heat transferred first to a non-fuel liquid coolant system before being sunk to fuel in turn.

Figure 5:
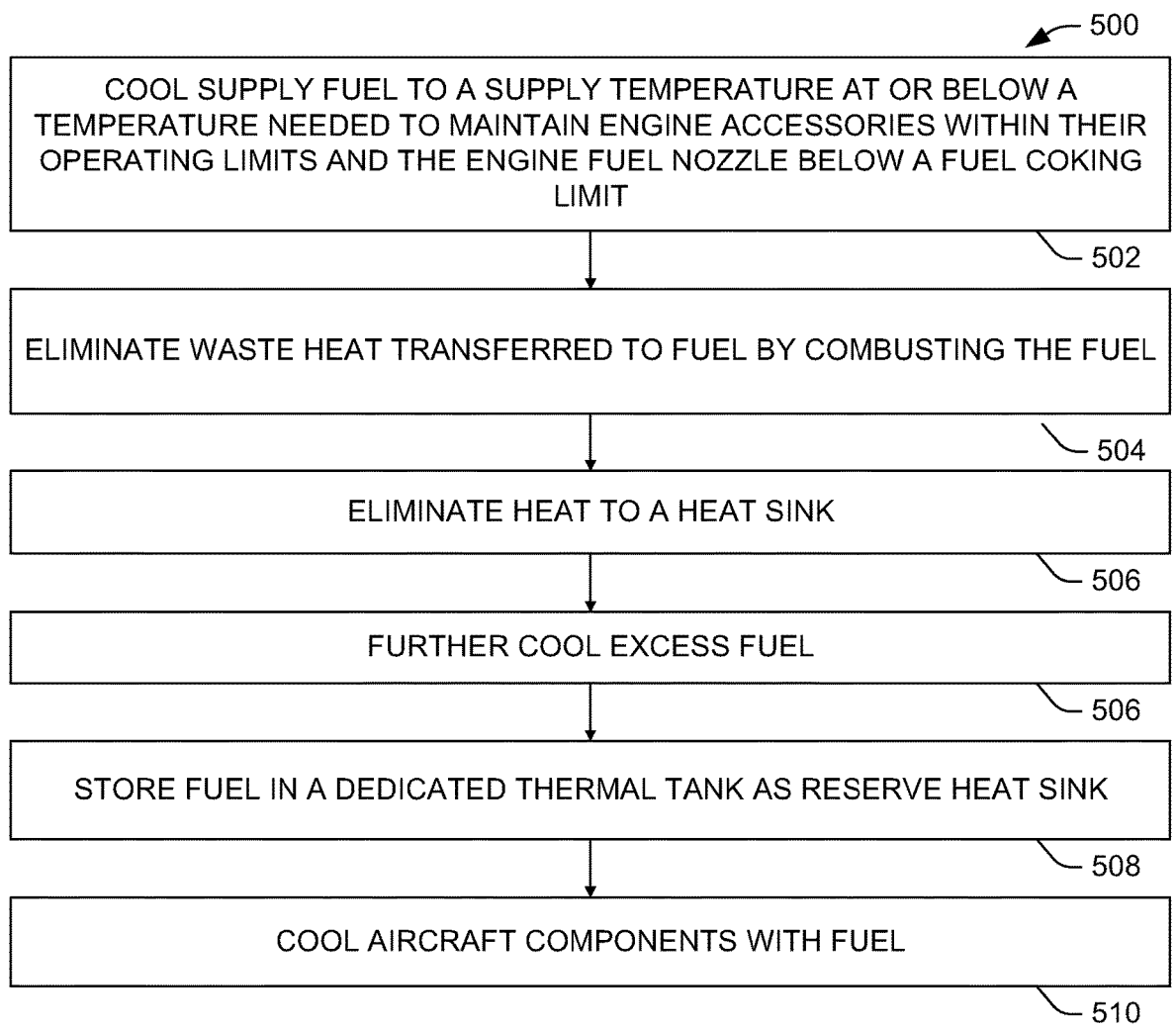

FIG. 5 is a flow chart showing another example method 500 of active cooling of an aircraft. Method 500 can begin by cooling 502 supply fuel to a supply temperature at or below a temperature needed to maintain engine accessories within their operating limits and the engine fuel nozzle below a fuel coking limit. This cooling can be done, for example, using an PTM, such as PTM 202. Method 500 can continue with elimination 504 of waste heat transferred to fuel by combusting the fuel. Such combustion can happen, for example, in the core of an engine, such as engine(s) 208, 308. Method 500 can further include eliminating 506 heat to a heat sink. The heat can be eliminated from, to example, the PTM 202, and the heat sink can be sink 218, which can be, for example, ram air, engine fan air, or third-stream air.

Method 500 can continue by further cooling 506 excess (i.e., uncombusted) fuel. Again, this cooling can be done, for example, using an PTM, such as PTM 202, or using a compact engine-mounted turbo machine, such as turbo cooler 318. Next, fuel can be stored 508 in a dedicated thermal tank as reserve heat sink. Aircraft components can be cooled 510 using the fuel. For example, heat can be transferred from aircraft components to fuel using one or more liquid-to-liquid or air-to-liquid heat exchangers. The cooled aircraft components can include, for example, periodic high heat flux equipment, which can correspond, for example, to loads 216, 316 in FIGS. 2b and 3b, respectively. One or more of the components can be cooled indirectly, with waste heat transferred first to a non-fuel liquid coolant system before being sunk to fuel in turn.

Figure 6:
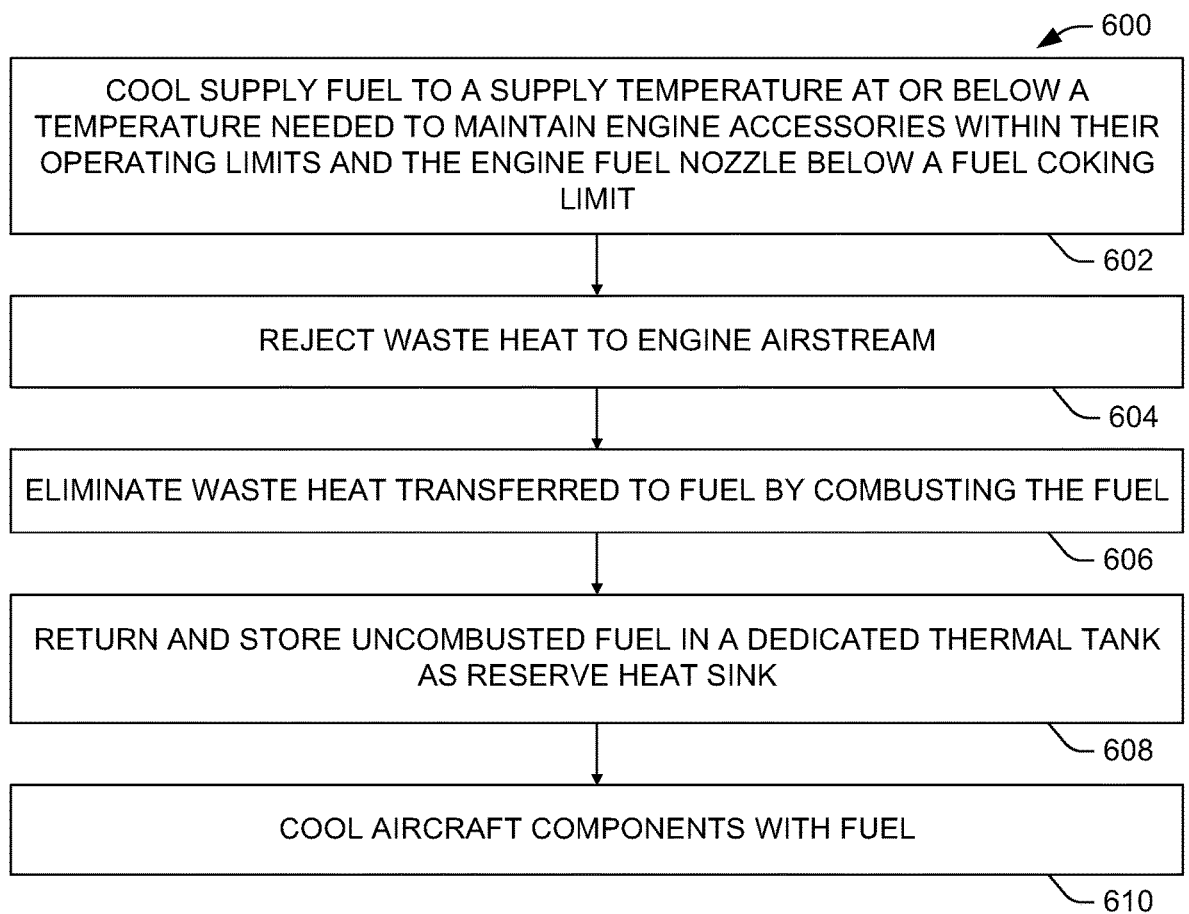

FIG. 6 is a flow chart showing another example method 600 of active cooling of an aircraft. Method 600 can begin by cooling 602 supply fuel to a supply temperature at or below a temperature needed to maintain engine accessories within their operating limits and the engine fuel nozzle below a fuel coking limit. This cooling can be done, for example, using a compact engine-mounted turbo machine, such as turbo cooler 318. Method 600 can continue with rejection 604 of waste heat to the engine airstream. Such rejection can occur, for example, by the return of expanded air from turbo cooler 318 to the engine turbine discharge to rejoin the main flow of engine 308 for producing thrust.

Method 600 can also include elimination 606 of waste heat transferred to fuel by combusting the fuel. Such combustion can happen, for example, in the core of an engine, such as engine(s) 308. Next, uncombusted fuel can be returned and stored 608 in a dedicated thermal tank as reserve heat sink. Aircraft components can be cooled 610 using the fuel. For example, heat can be transferred from aircraft components to fuel using one or more liquid-to-liquid or air-to-liquid heat exchangers. The cooled aircraft components can include, for example, periodic high heat flux equipment, which can correspond to loads 216, 316 in FIGS. 2b and 3b, respectively. One or more of the components can be cooled indirectly, with waste heat transferred first to a non-fuel liquid coolant system before being sunk to fuel in turn.

The elements of methods 400, 500, 600 can take place in any order, and can be arranged as cycles or loops, wherein thermally conditioned fuel is heated by aircraft components and thermally conditioned and stored again successively, without limit, prior to finally being combusted.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

We claim:

1. An active aircraft thermal management system comprising:
    at least one fuel supply conduit configured to provide supply fuel, having a coking limit, from at least one fuel storage tank, to sink waste heat from one or more aircraft systems to the supply fuel, and send the waste heat to one or more engines via the supply fuel;
    at least one engine fuel system configured to sink heat from engine lubricant to the supply fuel and to provide at least one of the one or more engines with the supply fuel for combustion;
    at least one return fuel conduit configured to return the supply fuel as return fuel;
    a power and thermal module (PTM) configured to monitor temperature of the supply fuel, the PTM comprising an air cycle machine configured to provide power to start one or more of the one or more engines, condition air to provide cool air to a thermal load, thermally condition the supply fuel to below a supply temperature such that the supply fuel cools components of at least one of the one or more engines and remains below the coking limit prior to the combustion in any of the one or more engines, and thermally condition the return fuel; and
    a thermal tank configured to hold the thermally conditioned return fuel.

2. The system of claim 1, further comprising:
    a vapor cycle system configured to cool one or more sensors and/or avionics using a non-fuel liquid coolant; and
    at least one liquid-to-liquid heat exchanger configured to sink heat from the non-fuel liquid coolant to fuel from the thermal tank.

3. The system of claim 1, further comprising:
    one or more pieces of onboard periodic high heat flux equipment;
    at least one liquid-to-liquid heat exchanger configured to sink heat from the one or more pieces of onboard periodic high heat flux equipment to a non-fuel liquid coolant; and
    a heat exchanger configured to sink heat from the non-fuel liquid coolant to the thermally conditioned fuel from the thermal tank.

4. The system of claim 3, further comprising a high-priority thermal load arranged along the at least one fuel supply conduit between the at least one fuel storage tank and the one or more engines, the high-priority thermal load being one of a engine control unit, an electrical generator, or a pump.

5. The system of claim 3, wherein the PTM is configured to sink the waste heat to ambient air via a ram air intake.

6. The system of claim 3, further comprising at least one liquid-to-liquid heat exchanger configured to sink heat from the engine lubricant and at least one aircraft accessory to the supply fuel.

7. A method for active aircraft thermal management comprising:
   providing supply fuel, having a coking limit, from at least one fuel storage tank via at least one fuel supply conduit, to sink waste heat from one or more aircraft systems to the supply fuel;
   sending the waste heat to one or more engines via the supply fuel;
   sinking heat from engine lubricant to the supply fuel via at least one engine fuel system and providing at least one of the one or more engines with the supply fuel for combustion via the at least one engine fuel system;
   returning the supply fuel as return fuel via at least one return fuel conduit;
   monitoring temperature of the supply fuel with a power and thermal module (PTM), the PTM comprising an air cycle machine (ACM);
   providing power to start one or more of the one or more engines using the ACM;
   conditioning air with the ACM to provide cool air to a thermal load;
   thermally conditioning the supply fuel using the ACM to below a supply temperature such that the supply fuel cools components of at least one of the one or more engines and remains below the coking limit prior to the combustion in any of the one or more engines;
   thermally conditioning the return fuel with the ACM;
   holding the thermally conditioned return fuel in a thermal tank.

8. The method of claim 7, further comprising:
   cooling one or more sensors and/or avionics using a non-fuel liquid coolant via a vapor cycle system; and
   sinking heat from the non-fuel liquid coolant to fuel from the thermal tank via at least one liquid-to-liquid heat exchanger.

9. The method of claim 7, further comprising:
   sinking heat from one or more pieces of onboard periodic high heat flux equipment to a non-fuel liquid coolant via at least one liquid-to-liquid heat exchanger; and
   sinking heat from the non-fuel liquid coolant to fuel from the thermal tank via a heat exchanger.

10. The method of claim 7, further comprising sinking heat from a high-priority thermal load arranged along the at least one fuel supply conduit between the at least one fuel storage tank and the one or more engines to the thermally conditioned fuel from the thermal tank, the high-priority thermal load being one of an engine control unit, an electrical generator, or a pump.

11. The method of claim 7, further comprising using the PTM to sink the waste heat to ambient air via a ram air intake.

12. The method of claim 7, further comprising sinking heat from at least one aircraft accessory to the supply fuel via at least one liquid-to-liquid heat exchanger.

* * * * *